United States Patent [19]

Holmes

[11] 3,844,419

[45] Oct. 29, 1974

[54] SKY LINE LOGGING APPARATUS

[76] Inventor: Melvin W. Holmes, Rt. 3, Box 184, Reedsport, Oreg. 97467

[22] Filed: Jan. 12, 1973

[21] Appl. No.: 323,970

[52] U.S. Cl. .................. 212/122, 212/98, 212/107
[51] Int. Cl. ............................................ B66c 21/00
[58] Field of Search ............ 212/71, 76, 78, 83, 86, 212/87, 91, 94, 96, 97, 98, 106, 107, 110, 111, 112, 113, 116, 118, 119, 122, 89

[56] References Cited
UNITED STATES PATENTS

| | | | |
|---|---|---|---|
| 1,504,753 | 8/1924 | Guerin | 212/97 X |
| 1,725,325 | 8/1929 | Whitlock | 212/122 |
| 2,790,561 | 4/1957 | Wyssen | 212/122 X |
| 3,058,601 | 10/1962 | Wyssen | 212/122 X |
| 3,083,839 | 4/1963 | McIntyre | 212/122 X |

*Primary Examiner*—Evon C. Blunk
*Assistant Examiner*—James L. Rowland
*Attorney, Agent, or Firm*—Graybeal, Barnard, Uhlir & Hughes

[57] ABSTRACT

A carriage for use in sky line logging systems of the type including generally a sky line on which the carriage rides, a main line or a tag line connected to the main line and extending vertically downward from the carriage to raise and lower logs and a haulback line to move the carriage in at least one direction along the sky line. The carriage including first brake means associated with the sky line and second brake means associated with one of the other lines, usually the haulback line, and means alternately releasing and clamping the brakes such that the carriage is locked to either the sky line or the haulback line. The means controlling the brake actuation including a trigger mechanism cocked and actuated in response to both movement and stoppage of the carriage on the sky line and the pivoting of a multi-arm lever. Gate means are provided on the carriage holding and releasing the tag line and a load disposed thereon.

6 Claims, 6 Drawing Figures

SKY LINE LOGGING APPARATUS

BACKGROUND OF THE INVENTION

1. Field of the Invention

This invention relates, in general, to equipment for use in high line logging operations, and in particular, to a high line logging carriage capable of functioning partially automatically at a distance from a yarding apparatus.

2. Description of the Prior Art

Complete lifting and suspension of cut logs by sky line or high line logging is a relatively recent development in the logging industry which is now being used on an ever increasing scale because of its many advantages including the moving of a felled tree to a landing area with little or no damage to other trees which are to be left standing in the area. High yield forestry often requires the thinning of 25 to 70 year old trees to properly space the remaining trees to achieve maximum growth. Carriages for use in high line logging are known per se as shown for instance by U.S. Pat. Nos. 1,697,938 and 1,782,528. Neither of these patents disclose automatic means for lowering a load lifting line at a desired location either in the yarding area or at the log pick up area.

Carriages actuated by electronic controls are also known, but these units are both expensive and subject to lengthy and expensive breakdowns and serious damage should a supporting cable break.

A relatively complicated overhead rope way conveyor including a compressor building up oil pressure in a reservoir in response to rotation of a wheel on a moving crab is disclosed in U.S. Pat. No. 3,512,656. The old U.S. Pat. No. 887,065 discloses an overhead carrier constructed to lower a load in response to the manipulation of ropes connected thereto, while U.S. Pat. No. 1,817,264 discloses a control comprising a threaded slider moved in response to movement of the carriage on its support rope.

BRIEF SUMMARY OF THE INVENTION

This invention relates to a carriage for use in sky line logging in conjunction with a conventional yarding machine, preferably of the three or four drum type. In one arrangement the carriage is mounted for movement on wheels along a sky line in response to the winding and unwinding of a haulback line and interconnected main line clamped by the carriage, while a tag line interconnected with the haulback line or main line extends through the carriage and may be raised or lowered to lift and carry loads. The tag line extends over a yoke mounted sheave within the carriage and includes a pressed nub mounted near its log engaging end. During lead lifting, the pressed nub is drawn into the carriage and bears against a multi-arm lever to release a brake on the sky line, set a brake on the haulback line, cock a trigger mechanism and slide a pressed nub support plate therebeneath to prevent the nub from dropping downwardly out of the carriage and thus also preventing inadvertent lowering of the load. Movement of the carriage along the sky line actuates a fluid pump to raise a piston in a cylinder associated with a trigger mechanism. When the carriage is stopped above the point where the tag line is to be lowered, the fluid is automatically bled from the cylinder lowering the previously raised piston to trigger the pivoting of a multi-arm lever to initially set the sky line brake, release the haulback line brake, and free the pressed nub holding plate for sliding movement when the load pressure is removed therefrom. Retraction of the tag line at this stage lifts the pressed nub allowing its support plate to slide from beneath it thereby throwing the entire weight of the tag line and its load onto the yoke supported sheave to compress a cylinder to increase the brake pressure on the sky line.

It will be understood that the carriage invention disclosed herein may be used with obvious modifications in conjunction with all known sky line logging arrangements such as those used for partial cutting, grapple logging, and side block or strip logging.

It is an object of the present invention, therefore, to provide a sky line logging system including a conventional spar and yarding apparatus mounting a carriage of simple and sturdy construction to raise, transport and lower cut logs from a cutting area to a landing area.

Another object of the instant invention is to provide a carriage having wheels engaging a sky line and actuating a pump as the carriage moves on the sky line to move a piston which is automatically moved in the opposite direction when the carriage movement stops to trigger a plurality of functions.

Still another object of the instant invention is to provide a carriage for use with a sky line logging system having a sky line brake and a haulback line brake, the sky line brake including an initial clamping pressure supply system and a primary clamping pressure supply system.

Another object of the instant invention is to provide a carriage for use in sky line logging having a multi-arm lever extending between a sky line clamping portion of the carriage and a load lifting and holding portion of the carriage and transmitting movement therebetween.

One more object of the present invention is to provide a sky line logging carriage engaging a pressed nub on the load lifting line such that the weight of the load prevents accidental release and lowering thereof to the ground.

An additional object of the present invention is to provide a sky line logging carriage wherein the weight of the load lifted is employed to hold the carriage fixed on the sky line during lifting.

Still another object of the present invention is to provide a sky line logging carriage of unique mechanical arrangement providing breakdown free operation over a long period of time and the durability to withstand dropping or other sharp blows.

Other and additional advantages of the present invention will be apparent from the following description taken in conjunction with the attached drawings.

DETAILED DESCRIPTION OF THE DRAWINGS

DETAILED DESCRIPTION OF THE INVENTION

Figure 1:
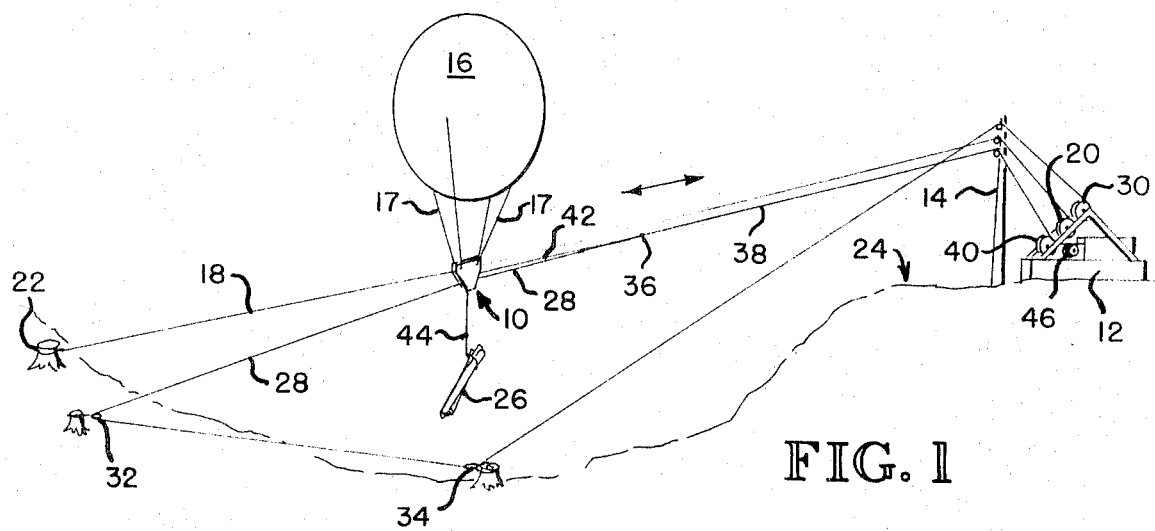
FIG. 1 is a schematic diagram of a typical sky line logging arrangement employing the carriage of the instant invention.

Referring initially to FIG. 1, a typical sky line logging arrangement is disclosed including the carriage 10, a conventional four drum yarder 12, a spar pole 14 and a balloon 16 mounted on carriage 10 by means of cables 17 to provide additional vertical lift to relieve a portion of the load on the sky line. The sky line 18 extends from drum 20 on the yarder through a sheave mounted near the top of spar 14 to an anchoring point such as stump 22 at a distance from the landing area 24 adjacent the spar pole. Preferably, the sky line is rigged to extend over the area to be logged at a sufficient height to allow cut logs 26 to be lifted clear of the ground beneath the carriage 10 and transported to the landing area rather than dragged thereto as is necessary in conventional logging. A haulback line 28 extends from drum 30 on the yarder through a sheave near the top of the spar pole outwardly to a tail block 32 anchored to a stump or the like and then back to or through carriage 10. In the particular arrangement disclosed, brush block 34 is provided laterally spaced from the sky line to prevent the logs being carried beneath the carriage from becoming entangled therewith. Further, the haulback line extends through the carriage to a swivel 36 connected with the main line 38 as shown in greater detail in FIG. 2. Main line 38 extends from drum 40 on the yarder through a sheave near the top of the spar pole outwardly to swivel 36. As shown, a tag line 42 is further provided running from swivel 36 through the carriage 10 and downwardly therefrom. Depending on the type of logging, chokers, grapples or other log engaging apparatus are connected to the lower end of tag line 42. A metal nub 44 is pressed in a conventional manner on tag line 42 a short distance from its lower end, preferably three to 10 feet.

The carriage of the instant invention may, with little or no modification, be used with substantially all high line logging arrangements, including those where the main line runs directly through the carriage 10 and is employed to pick up logs while the haulback line is fastened directly to the carriage or to the log engaging means, such as a grapple, mounted on the end of the main line. FIG. 1 is illustrative of one satisfactory arrangement for using the present invention, and is not intended to be limitive of the scope of the present invention. The fourth drum 46 on yarder 12 holds a lightweight straw line which is used to pull the remaining lines during setup.

Figure 2:
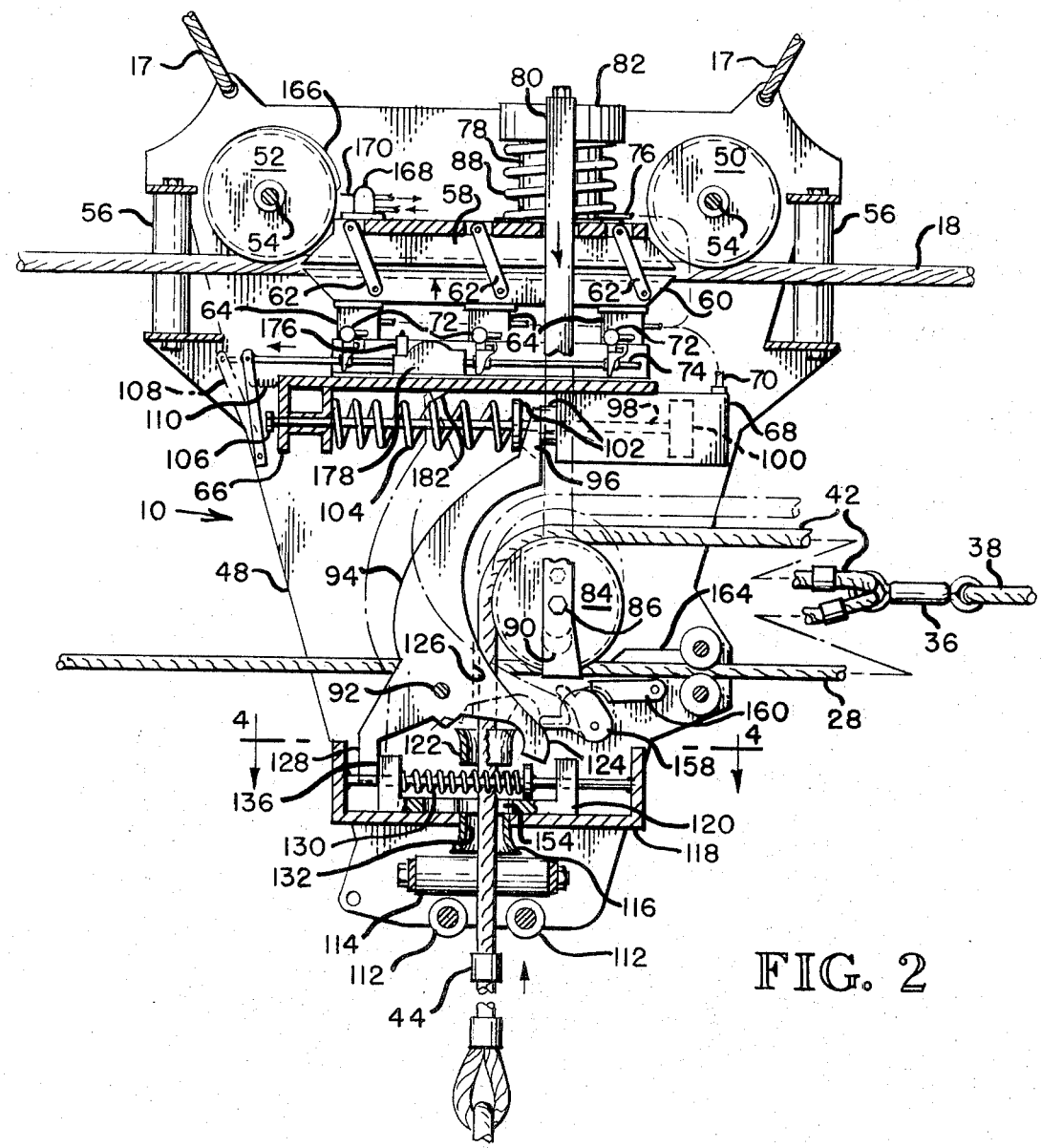
FIG. 2 is a partial side elevation view of a typical form of sky line logging carriage made according to the teachings of the instant invention, the carriage being shown in the load lifting mode of operation.

Referring specifically to FIG. 2, carriage 10 is shown to include an outer frame 48 to which the internal operational and support structure of the carriage is mounted. Wheels 50 and 52 are mounted on frame mounted axles 54 near the top of the carriage and are adapted to engage and ride on the sky line 18 which extends through the carriage and is guided in its passage therethrough by means of vertical rollers 56 which maintain the sky line in lateral alignment with the wheels 50 and 52. It will be understood that additional rollers may be provided for both vertical and horizontal aligning purposes but for clarity in the drawing only the single set of rollers has been shown. As will be discussed more completely hereafter, sky line 18 additionally runs between a pair of clamping members 58 and 60 which are themselves interconnected by pivotal side support members 62.

Clamp 60 is bottom supported on a plurality of expandable cylinders 64 which in turn are mounted on an L-shaped structural support plate 66 mounted rigidly on the carriage frame. Expanders 64 are interconnected with cylinder 68 by means of tubing 70 and each expander includes a release valve 72 operable in response to movement of rod 74. The expanders are adapted to be raised or lowered to press clamps 58 and 60 together on the sky line or allow them to move apart.

Expanders 64 are additionally interconnected by means of tubing 76 with compressible cylinder 78 mounted beneath yoke 80 and associated cap and spring retainer 82. Sheave 84 over which tag line 42 runs is supported for rotation on axle 86 extending between the bottom portions of the legs of yoke 80. It will be understood that the placement of a load on the tag line pulls yoke 80 downwardly against the force of compression spring 88 to force hydraulic fluid from within compressible cylinder 78 through tubing 76 into expanders 64. The opposite side walls of the carriage include slots or support tracks 90 in which the legs of the yoke 80 slide vertically, the length of travel of the yoke being controlled by the length of the support tracks. It will thus be seen that brake clamps 58 and 60 are provided with both initial and primary means whereby fluid is forced to expanders 64 to cause the sky to be clamped.

Mounted for pivotal movement on pin 92 is a multi-arm lever 94 which, as illustrated, includes three arms having working surfaces associated with each whereby the pivoting of the lever results in the simultaneous performance of a plurality of functions. The upper arm of lever 94 includes a slotted finger portion 96 interconnected with piston rod 98. Piston 100 is mounted on rod 98 within cylinder 68. Fixed contact plates 102 are spaced longitudinally on the rod 98 on opposite sides of fingers 96 such that the pivoting of lever 94 moves piston rod 98 into or out of cylinder 68 and either compresses spring 104 or allows it to expand. Additionally, piston rod 98 extends through a generally like-sized hole in the vertical portion of L-shaped support plate 66 and includes a contact knob 106 mounted on its longitudinal end distal from piston 100, which knob is positioned to contact and pivot lever 108 against the force of spring 110 to move rod 74 and open release valves 72 associated with expanding cylinders 64.

Transversely oriented guide rollers 112 and 114 are mounted on the lower portion of carriage support frame 48 to guide the tag line 42 and its pressed nub 44 through the carriage along a path whereby the pressed nub is moved through aligning tube 116 mounted on the metal structural support plate 118, through holes in support plate 118 and pressed nub supporting plate 120, through aligning tube 122 and against the lower foot 124 of the multi-arm lever 94. Foot 124 includes a slot 126 sized to allow tag line 42 to pass freely therethrough but to prevent the passage of pressed nub 44 such that raising of the tag line through the carriage causes the pressed nub to contact and bear on foot 124 such that the multi-arm lever is pivoted in the counterclockwise direction as shown in FIG. 2. As will be discussed more completely below, the counterclockwise pivoting of the multi-arm lever causes its second foot portion 128 to contact and slide pressed nub supporting plate 120 on plate 118 against the pressure of coil springs 130.

Figure 4:
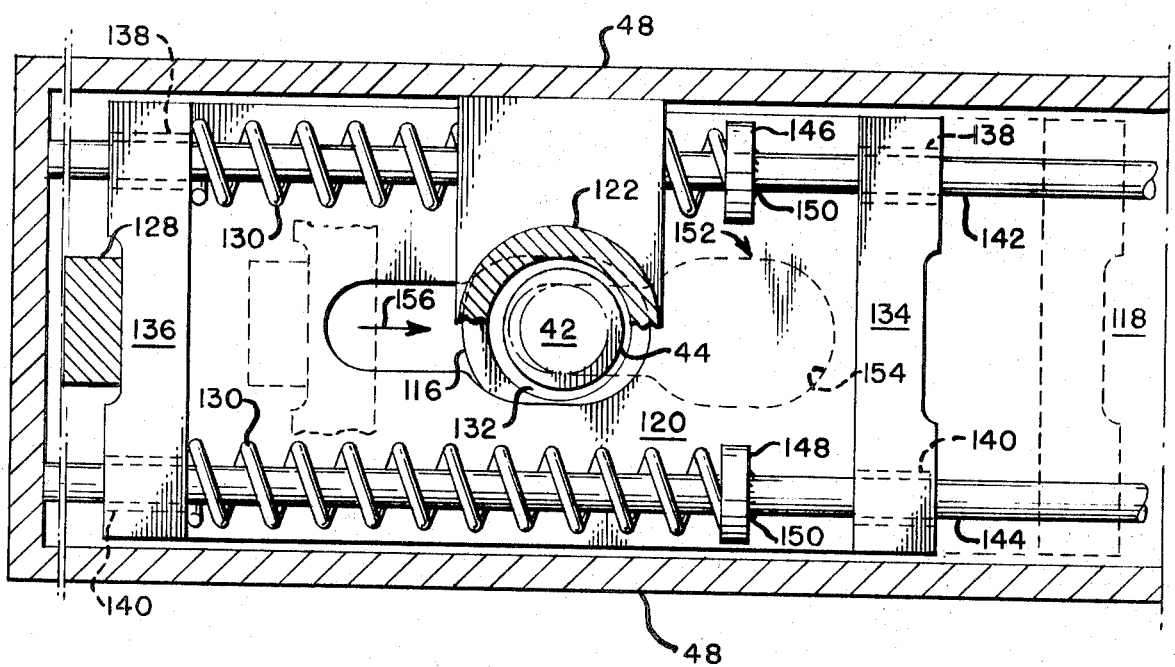
FIG. 4 is a view taken along line 4—4 of FIG. 2.

Referring additionally to FIG. 4, the lower portion of the carriage is shown to include bottom plate 118 having an opening 132 disposed centrally therein and aligned with tag line 42 such that both the tag line and the pressed nub may pass freely therethrough. Pressed nub supporting plate 120 is slidably mounted on top of plate 118 and includes upstanding end portions 134 and 136 each having a pair of aligned holes 138 and 140 spaced laterally thereon and sized to allow spring guide shafts 142 and 144, which are end mounted in the upstanding end portions of plate 118, to pass freely therethrough such that pressed nub support plate 120 is movable on said spring guide shafts. The spring guide shafts 142 and 144 include collars 146 and 148 mounted thereon by means of welds 150 or the like which act to support one of the longitudinal ends of the compression springs 130. The opposite ends of these springs bear against upstanding portion 136 of the pressed nub support plate and it will be understood that the springs tend to bias the slide plate to the position shown in full line in FIG. 4. Pressed nub support plate 120 includes a keyhole shaped opening 152 having a head portion 154 which may be substantially equal in size to hole 132 in support plate 118 and a tail portion 156 sized to allow tag line 42, but not the pressed nub 44, to pass therethrough. It will be understood that when sliding plate 120 is biased to the left by springs 130 as shown in full line in FIG. 4, openings 154 and 132 in the overlying plates are aligned such that the pressed nub 42 may pass freely therethrough and move upwardly to contact foot 124 of the multi-arm lever. When the multi-arm lever is pivoted in the counterclockwise direction, its foot 128 contacts upstanding portion 136 of the pressed nub support plate and moves the plate to the right compressing spring 130 and aligning the smaller tail portion 156 of the keyhole shaped opening with the hole 132 in the plate 118 such that the pressed nub is no longer able to pass downwardly through support plate 120. It will be understood that foot 128 prevents the nub support plate from being moved back to the left until after the multi-arm lever is again pivoted in the clockwise direction so that foot 128 returns to the position shown in FIG. 4. However, even after the clockwise pivoting of the multi-arm lever, the weight of the cable, pressed nub and any load held thereby holds the sliding plate to the right to prevent the compressed springs 130 from moving the plate to the left to again align openings 154 and 132. Only after a short retraction of the tag line 42 to lift the pressed nub from plate 120, are the compression springs 130 automatically able to move the sliding plate to the left to again allow the pressed nub to pass downwardly through the aligned openings 154 and 132.

Figure 5:
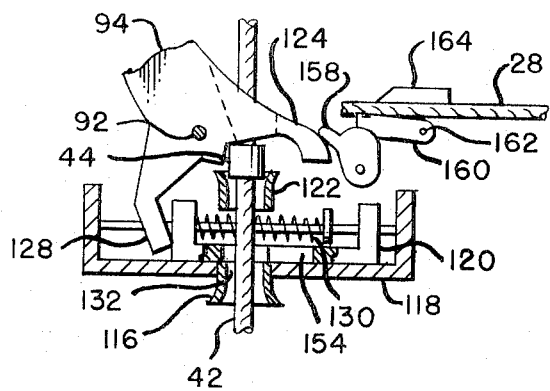
FIG. 5 is a partial elevation view of the pressed nub holding portion of the carriage of the instant invention in one mode of operation wherein the pressed nub is drawn into the carriage.
Figure 6:
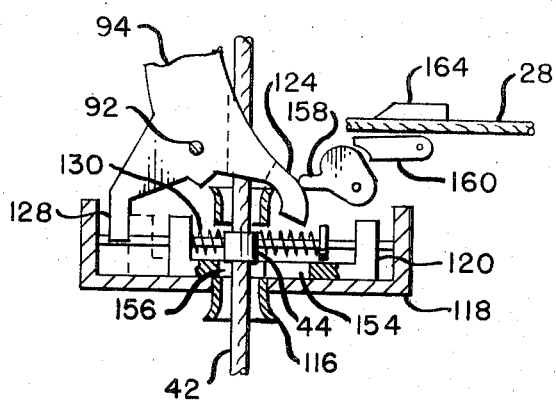
FIG. 6 is a view similar to FIG. 5 showing the pressed nub holding portion of the carriage in a second mode of operation wherein the pressed nub is supported on a slidable supporting plate.

Referring additionally to FIGS. 5 and 6 wherein two operating positions of the pressed nub holding portion of the carriage are disclosed, it will be seen that foot portion 124 of the multi-arm lever additionally acts, when pivoted in the counterclockwise direction, to set a brake on the haulback line. In particular as shown in FIG. 5, foot 124 contacts pivotally mounted dog 158 and causes it to bear against haulback line clamp 160 which is pivotally mounted about its end 162, such that the clamp 160 moves toward its cooperating clamp 164 to squeeze and hold the haulback line 28 therebetween.

As shown in FIG. 6, when the multi-arm lever 94 is pivoted in the clockwise direction, dog 158 pivots downwardly and releases its contact pressure on clamp 160 to release the haulback line.

Figure 3:
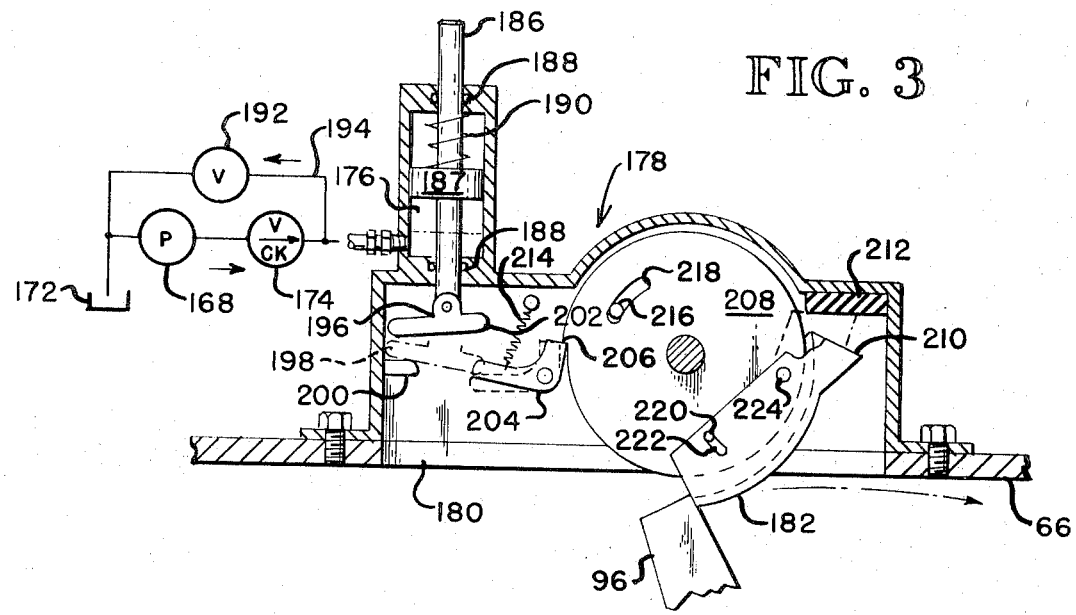
FIG. 3 is a partial side elevation view of a typical trigger mechanism suitable for use in conjunction with the sky line carriage of the instant invention.

One complete operating cycle of the high line logging arrangement disclosed in FIG. 1 will now be set forth. Assuming a load of logs has been deposited at the landing area 24 and the carriage is moving outwardly along the sky line 18, a cam 166 or the like (FIG. 1) mounted for rotation on or adjacent one of the sky line engaging wheels, such as wheel 52, operates an oil pump 168 by means of the repeated actuation of a switch 170 against which the cam bears. Referring to FIG. 3, it will be seen that pump 168 is positioned in a fluid circuit whereby operation thereof caused by rotation of wheel 52 as the carriage moves along the sky line draws fluid from a reservoir 172 and pumps it through a check valve 174 into cylinder 176 associated with trigger mechanism 178. As seen in FIG. 1, the trigger mechanism 178 is preferably mounted above a slot 180 on L-shaped support plate 66 such that the weighted dog 182 bears against and holds the portion 96 of the multi-arm lever 94 in the cocked position against spring 104.

Cylinder 176 includes a piston 187 mounted on a piston rod 186 which extends through openings in the top and bottom portions of cylinder 176 which are sealed against leakage by means of conventional ring seals 188. A compression spring 190 is mounted on piston rod 186 above piston 187 to bias the piston downwardly, and it will be understood that this spring is compressed upwardly by the pumping of fluid into cylinder 176 as the carriage moves along the sky line.

In addition to check valve 174 in the direct line from the pump to the cylinder 176, a small diameter valve 192 is provided in a branch line 194 to allow fluid to flow slowly from the cylinder 176 back to reservoir 172. In operation, actuation of the pump 168 as the carriage moves along the sky line causes piston 187 to move upwardly in the cylinder 176 to compress spring 190. When the carriage is stopped at the desired position over the log pick up area, pump 168 ceases functioning and compression spring 190 forces fluid through valve 192 back to the reservoir as it moves downwardly in cylinder 176. Other conventional valve arrangements may be provided in place of that illustrated so long as they accomplish the purpose of allowing piston 187 to be raised while pump 168 is operating and lowered automatically under the pressure of spring 190 when the carriage stops. Foot 196 is mounted for pivotal movement on the bottom portion of piston rod 186 and as the piston moves downwardly in its cylinder, the heel portion 198 of the foot contacts stop member 200 causing the toe 202 to bear against pivotally mounted pin 204 and move it out of notch 206 on cam wheel 208. Spring 104 which bears on arm 96 of the multi-arm lever, then rotates cam wheel 208 in the counterclockwise direction such that the dog 182 releases the arm 96. As will be understood from the following discussion, foot 196 is pivotally mounted to allow toe 202 to move freely past pin 204 during cocking of the trigger mechanism when piston rod 186 is moved upwardly through cylinder 176.

The pushing of arm 96 past dog 182 causes the entire cam wheel 208 to rotate until upper end 210 of the dog contacts resilient pad 212, and the rebound force thus imparted to the dog combined with its normal tendency to rotate in the clockwise direction due to the offset mounting of the dog 182 on cam wheel 208 immediately cause the cam wheel to return to its original position such that pin 204 which bears against the cam wheel under the pressure of spring 214 re-engages the notch 206. Stop pin 216 extends through slot 218 in the cam wheel to limit the rotation thereof in both the clockwise and counterclockwise directions. Additionally, a stop pin 220 is mounted on the cam wheel and extends through a slot 222 in dog 182 to limit the pivotal movement of the dog about its pivot pin 224 during cocking of the arm 96 as discussed hereafter.

When coiled spring 104 pivots the arm 96 in the clockwise direction, piston rod 98 and piston 100 interconnected therewith move to the right forcing hydraulic fluid out of cylinder 68 and through hoses 70 into the multiple expanders 64 causing clamp plate 60 to move upwardly toward clamp plate 58 to initially clamp the sky line 18 to hold the carriage stationary thereon.

Simultaneously with the movement of arm 96, feet 124 and 128 of the multi-arm lever move in the clockwise direction such that foot 124 releases the haulback line brake while foot 128 moves out of contact with upstanding side portion 136 of the slotted pressed nub support member 120 allowing the compression springs 130 to slide the member 120 to the left to align holes 154 and 132. Depending on the weight of the pressed nub and the log gripping apparatus disposed on the end of the tag line 42, the compression springs 130 will either move the support plate 120 to the left immediately or as soon as the tag line is retracted to remove the weight from the plate. The tag line may then be lowered through the aligned holes 154 and 132. FIG. 6 illustrates the operational position of this portion of the carriage shortly after the dog 182 has released the multi-arm lever 94. The pressed nub 44 is shown still bearing on sliding plate 120 which has not yet been moved to align the openings.

The release of the haulback line brake allows the tag line to be lowered by the simultaneous unwinding and winding of the main line drum 40 and the haulback line drum 30 respectively. After the log attaching apparatus mounted on the end of the tag line has been connected by a ground crew to one or more logs, the main line drum and the haulback line drum are simultaneously wound and unwound respectively to lift the logs upwardly toward the carriage.

Referring particularly to FIG. 1, it will be understood that as the logs are lifted by the tag line, their weight is borne in substantial part by sheave 84 and this weight pulls yoke 80 downwardly compressing the fluid filled cylinder 78 against compression spring 88 to force additional fluid through hose 76 into the expanders 64 thereby placing additional clamping force on the sky line brake. It will be understood that the initial braking force provided by the fluid from cylinder 68 is sufficient to hold the carriage stationary on the sky line at all times when a load is not being lifted, but the substantial longitudinal force exerted on the carriage through the lifting of a load of logs would pull the initially braked carriage along the sky line were it not for the additional clamping pressure provided through the yoke 80.

As the load is lifted to the stationary carriage, pressed nub 44 passes upwardly through the rollers 112 and 114, through the guide tube 116 and openings 132 and 154, and through guide tube 122 whereupon the pressed nub butts against foot 124 of the multi-arm lever 94. Continued upward movement of the pressed nub causes the multi-arm lever to pivot in the counterclockwise direction to a position substantially as shown in FIG. 5, wherein foot 124 clamps the haulback line brake while foot 128 slides the slotted pressed nub support plate 120 to the right against the force of compression springs 130. The sliding of plate 120 to the right moves the head portion 154 of the opening in the plate out of alignment with opening 132 in the support plate 118 allowing the pressed nub to be lowered downwardly onto the plate 120 and the tag line load supported thereon rather than on the sheave 84. Yoke 80 now moves upwardly allowing cylinder 78 to expand and receive fluid when release valves 72 are opened as discussed hereafter.

Simultaneous with the movement of feet 124 and 128, arm 96 moves to the left to a position as shown in dotted line in FIG. 2, compressing spring 104 and moving past and being held by dog 182 in the cocked position. Contact nub 106 on the piston rod 98 pivots lever 108 against the force of spring 110 thereby opening valves 72 in the expanders 64 such that the fluid in the expanders drain back to cylinders 78 and 68, the fluid storage space of cylinder 68 having been enlarged by movement of piston 100 to the left therein. In this manner, all clamping force on the sky line brake is simultaneously released at substantially the same time as the haulback line brake is set. The carriage is now free to move on the sky line toward the landing area 24 in response to retraction of the main line 38. Release valves 72 remain open so long as the multi-arm lever is maintained in the cocked position thereby preventing premature braking of the carriage. As the carriage moves along the sky line, cam 166 on sky line wheel 52 again operates fluid pump 168 to raise piston 184 within cylinder 176 as previously discussed above with reference to FIG. 3.

When the carriage stops over the landing area 24, piston 187 moves downwardly in the cylinder 176 in response to the pressure of spring 190 thereby again pivoting multi-arm lever 94 which transmits the intial clamping force to the sky line brake, releases the haulback line brake and moves foot 128 to the left to allow the compression springs 130 to slide plate 120 to align the large opening therein beneath the pressed nub. As mentioned heretofore, the weight of the logs on the plate 120 prevents the springs 130 from immediately moving the plate to the left, and thus a lifting force must be exerted through the tag line 42 to raise the pressed nub from the plate 120 whereupon the springs 130 may operate. It will be understood that the requirement of a lift on the tag line before plate 120 may slide is a significant safety factor in preventing accidental dropping of a load of logs. The exertion of this lifting force again throws the weight of the load on sheave 84 drawing the yoke 80 downwardly to provide the main clamping force to the sky line brake as the load of logs is lowered to the ground and disconnected from the tag line. The tag line and its pressed nub are then again drawn upwardly into the carriage until the pressed nub contacts and pivots the multiarm lever setting the haulback brake, releasing the sky line brake and sliding plate 120 to the right to prevent the pressed nub from moving out of the carriage. The above described cycle is repeated to haul additional loads of logs from the work area to the landing area. From all of the above, it will be understood that this invention provides a substantial improvement in the art of sky line logging whereby logs may be substantially automatically lifted, held, transmitted to a yarding area and lowered in a safe manner using simple and durable equipment.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A carriage for use in a sky line logging system of the type including a sky line extending from a yarding apparatus at a height over a log pick up area to a tie down, a load lifting line movable vertically through said carriage to lift and hold logs to be carried, and a haulback line extending from said yarding apparatus through said carriage to pull said carriage on said sky line, said carriage including:

a frame having an opening on its bottom portion through which said load lifting line extends;

wheel means rotatably mounted on said frame and engaging said sky line such that said frame is movable thereon;

trigger means automatically operable in response to the stopage of movement of said frame on said sky line;

multi-arm lever means mounted on said frame to pivot in response to actuation of said trigger to hold said carriage stationary on said sky line and release said load lifting line for lowering through said carriage;

said load lifting line including log engaging means mounted on one end and a nub pressed thereon a distance from said end, said carriage including nub receiving and holding means whereby logs engaged by the end of said line may be held a distance above the ground; and said nub receiving and holding means including a sliding plate having a keyhole shaped opening therein, said nub being sized to pass through the head of said keyhole shaped opening and be supported by the tail of said opening, said sliding plate being movable in one direction in response to pivoting of said multi-arm lever means and slidable in the opposite direction in response to the expansion of spring means compressed by the pivoting of said multi-arm lever means.

2. The automatic carriage of claim 1 including an initial hydraulic brake system holding said carriage stationary on said sky line comprising:

a pair of brake shoes;

hydraulic lifting means associated with one of said brake shoes; and piston means interconnected with said multi-arm lever means and movable within a cylinder to force hydraulic fluid to said hydraulic lifting means to clamp said brake shoes on said sky line.

3. The automatic carriage of claim 2 including a sheave on which said load lifting line is channeled, a yoke supporting said sheave and mounted on a compressible fluid filled cylinder; hose means interconnecting said compressible cylinder and said hydraulic lifting means associated with one of said brake shoes such that the compression of said cylinder in response to the raising of a load forces hydraulic fluid to said hydraulic lifting means to provide a primary braking action of said carriage on said sky line.

4. The automatic carriage of claim 1 including cam means pivotally mounted on said frame adjacent said haulback line and pivotal in response to movement of said multi-arm lever means to clamp said haulback line such that said carriage moves therewith.

5. The automatic carriage of claim 1 wherein said trigger means includes a cylinder having a cooperating piston mounted and movable therein in response to the flow of fluid into or out of said cylinder, a piston rod extending outwardly from said cylinder, and, means holding said multi-arm lever means in the cocked position and releasing said multi-arm lever means in response to contact by said piston rod.

6. The automatic carriage of claim 5 wherein said automatic carriage means includes fluid pump means actuated by rotation of said wheel means engaging said sky line to pump fluid to said cylinder means to move said piston therein in a first direction, spring means encircling said piston rod and biased to move said piston opposite said first direction and, valve means controlling the movement of said piston in said opposite direction.

* * * * *